Jan. 19, 1965 N. C. WOGSLAND 3,165,917
APPARATUS FOR MEASURING BULK MODULUS OF VISCOELASTIC MATERIAL
Filed Dec. 19, 1962 2 Sheets-Sheet 2

INVENTOR.
BY Neal C. Wogsland

United States Patent Office 3,165,917
Patented Jan. 19, 1965

3,165,917
APPARATUS FOR MEASURING BULK MODULUS OF VISCOELASTIC MATERIAL
Neal C. Wogsland, Bel Air, Md., assignor to the United States of America as represented by the Secretary of the Army
Filed Dec. 19, 1962, Ser. No. 245,942
3 Claims. (Cl. 73—37)
(Granted under Title 35, U.S. Code (1952), sec. 266)

The invention described herein may be manufactured and used by or for the Government for governmental purposes without the payment to me of any royalty thereon.

This invention relates to a compression apparatus and more particularly to an apparatus for measuring the bulk modulus of viscoelastic materials.

It is well known that to make a stress analysis of an elastic material, several physical and mechanical properties of that material must be known. The mechanical behavior of the material can be described by four elastic constants; the shear modulus (G), the bulk modulus (K), Young's modulus (E), and Poisson's ratio (V).

In the case of a homogeneous and isotropic material, only two elastic constants are necessary to describe mechanical behavior since the two unknown constants can be determined from the usual relations:

$$E = \frac{9KG}{3K+G} \text{ and } V = \frac{3K-2G}{6K+2G}$$

For a viscoelastic material however, the problem of stress analysis is more difficult because the "constants" depend on both time and temperature. The basic relations previously stated remain valid but each "constant" is complex, being modified by time and temperature considerations. Studies have been made to determine the extent to which the theory of linear viscoelasticity can be applied to the stress analysis of viscoelastic materials, particularly solid rocket propellants. To correlate theory with experimental results, the complex shear modulus and the complex bulk modulus were chosen to be studied because of their dissimilarity and also because the accuracy of calculated quantities is less effected by small errors in measurement than when Poisson's ratio is used in conjunction with Young's modulus. In addition, the shear and bulk moduli may be regarded as the fundamental elastic constants from a physical point of view because the former measures the resistance of a material to change of form unaccompanied by change of volume and the latter measures its resistance to change of volume unaccompanied by change of form. The dynamic problem may be simplified by ignoring the bulk loss modulus, which is relatively insignificant, and considering only the real part, the bulk storage modulus. In addition, since the frequency dependence of the bulk storage modulus is very small compared to that of the shear modulus and Young's modulus, the equilibrium (quasi-static) bulk modulus is sufficient for many calculations in the solid-propellant field.

It is therefore a primary object of the present invention to provide an apparatus for measuring the equilibrium bulk modulus of viscoelastic materials.

Another object of this invention is a hydrostatic compressor by which both the isothermal and the adiabatic bulk modulus, or its reciprocal, compressibility, of a viscoelastic material can be determined.

A further object is an inexpensive apparatus to determine these bulk moduli, or compressibilities, for solid rocket propellants in low pressure regions.

A still further object is an apparatus to observe the presence of voids in viscoelastic materials such as solid propellants, to measure their effect on the compressibility properties of said materials during pressurization, and to measure the porosity of said materials.

Other objects and advantages of the present invention will hereinafter become more fully apparent from the following description of the annexed drawings which illustrate a preferred embodiment thereof and wherein.

Figure 1:
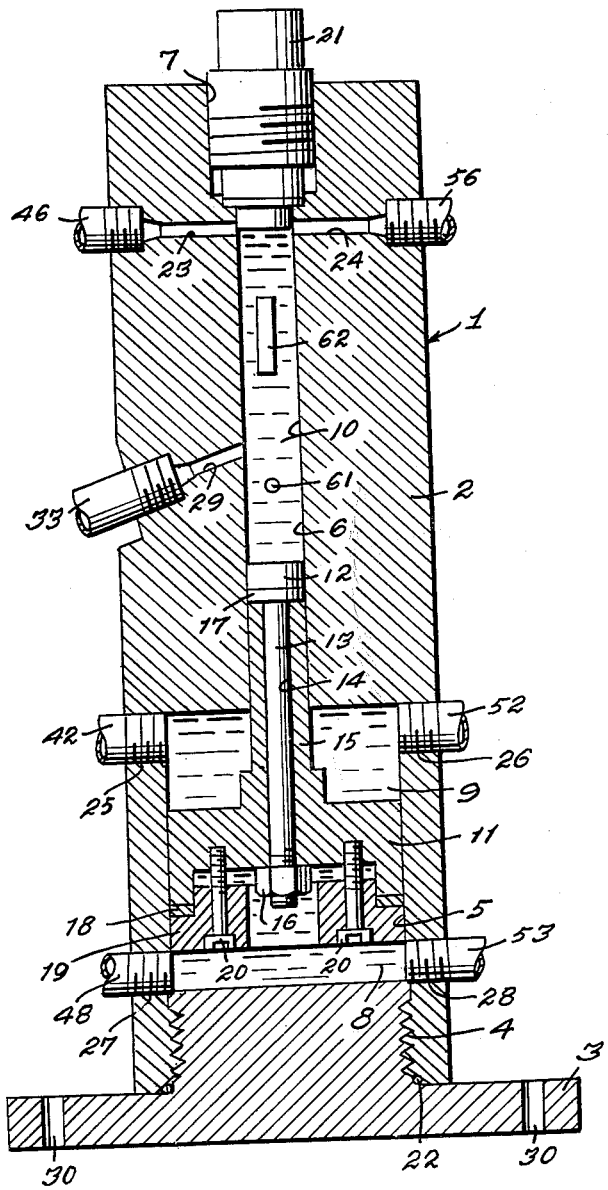
FIG. 1 is an axial section view of the pressure intensifier.

Referring in detail to the drawings, there is shown in FIG. 1 a pressure intensifier indicated generally by reference numeral 1. The pressure intensifier 1 comprises a cylindrically shaped housing 2 fixed to a circular base 3 by threads 4.

Housing 2 is provided with three coaxial bores of different diameters, 5, 6, and 7. Bore 5, wider than bores 6 and 7 forms a low pressure cylinder 8 and an intermediate cylinder 9, bore 6 forms a high pressure cylinder 10 and bore 7 is threaded to receive a closure plug 21.

A low pressure piston 11 divides the low pressure cylinder 8 from the intermediate cylinder 9 and is slidably mounted in bore 5. A high pressure piston 12 is slidable in bore 6 and is connected to piston 11 by a rod 13 secured in an axial bore 14 in an extension 15 of intermediate piston 11. The lower end of rod 13 is threaded to receive a nut 16 which secures the rod 13 in piston 11. A gasket 17 seals between bore 6 and piston 12.

Means for sealing between bore 5 and the intermediate piston 11 is provided and consists of a gasket 18 which is held against the lower end of piston 11 by a pressure ring 19 held by bolts 20 threadably engaging piston 11.

Bore 7 is threaded and is closed by a closure plug 21.

An O-ring 22 seals between the cylindrical housing 2 and the circular base 3.

Ports 23, 24, 25, 26, 27, 28 and 29 are provided and their function will be described later in the description.

Figure 2:
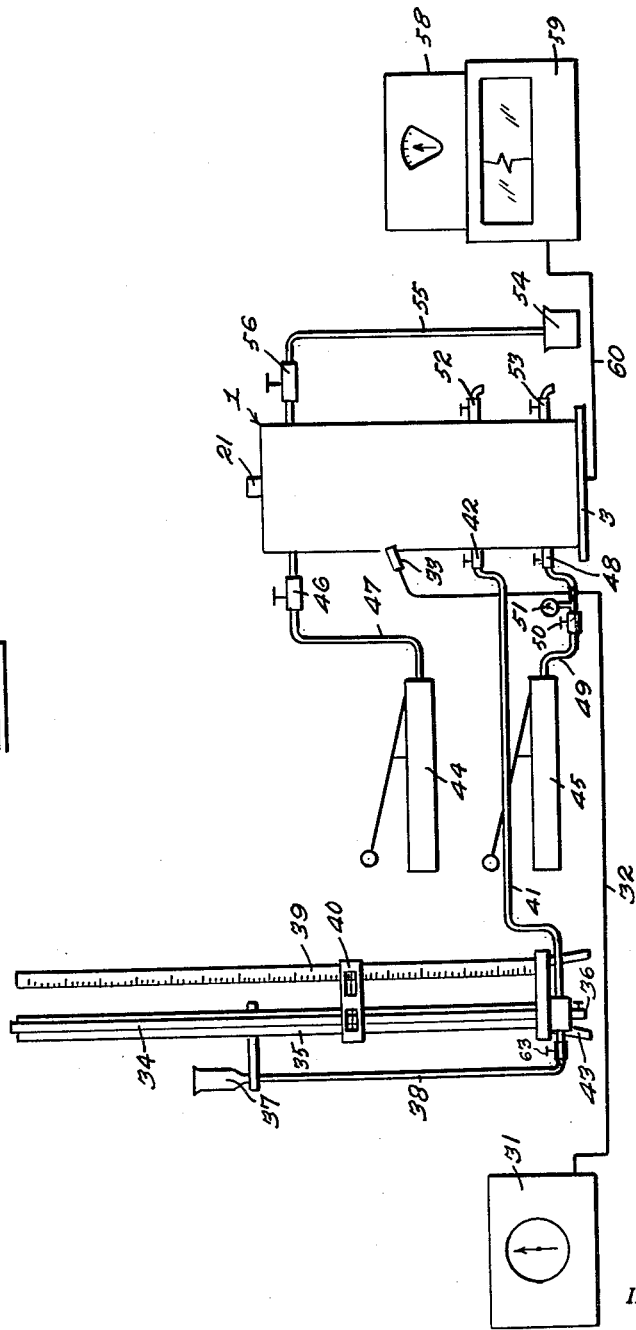
FIG. 2 is an elevation view of the components of the present invention.

In FIG. 2, the assembled apparatus of the invention is shown schematically.

The pressure intensifier 1 is secured to a suitable support (not shown) by bolts (not shown) in holes 30 provided in base 3.

A strain indicator (or recorder) 31 is connected by wiring 32 to a pressure transducer 33, which is secured in port 29 in housing 2.

A sight glass tube 34 is mounted on a vertical support 35. The lower end of sight glass tube 34 is provided with a drain valve 36 and a reservoir 37 is connected by pipe 38 to the lower end of sight glass 34 through valve 63. Means for reading sight glass 34 are provided and consists of a vertical scale 39 and a reading slide 40 which is slidably mounted on sight glass tube 34 and extends over scale 39.

The sight glass tube is connected by a pipe 41 connected to a port valve 42 attached to port 25 in intensifier 1. The sight glass tube assembly is mounted on a stand 43.

A pair of pressure pumps are indicated by 44 and 45. Pump 44 is connected to a port valve 46 by a pipe 47 and the port valve 46 is attached to port 23 in the intensifier 1. Pump 45 is attached to a port valve 48 by a pipe 49 and valve 48 is attached to port 27 in the intensifier 1. A second valve 50 is connected to pipe 49 and a pressure gage 51 is connected to pipe 49 between valves 48 and 50.

A pair of cut off valves 52 and 53 are attached to ports 26 and 28 respectively and an over flow beaker 54 is connected by a pipe 55 to a port valve 56 which is attached to port 24 in intensifier 1.

A microvolt amplifier 58 and strip chart recorder 59 are connected by wiring 60 to a thermo-couple 61 in bore 6.

Continuous electronic recording utilizing, for example, a multichannel pen recorder or oscillograph or individual units with a common time base would permit close examination of the test data and would be valuable and advisable for any extensive test program, especially for accuracy in obtaining adiabatic test data. For electronic recording, the piston displacement (volume change in chamber) measurement could be made by replacing the sight glass system 34 by an electric-resistance mercury manometer. The present thermocouple 61 and pressure transducer 33 would be used for temperature and pressure measurements. Timing signals also would be recorded.

When using the apparatus of the invention, a vacuum pump (not shown) is used to evacuate all air from the low-pressure, intermediate, and high-pressure cylinders 8, 9 and 10 of the intensifier respectively, and the low pressure gage 51 during set-up of the apparatus. The vacuum pump draws the air through ports 24, 26, and 28 with port valves 46, 42 and 50 closed, but with port valve 48 open. A hydraulic fluid, such as Hercoflex 600, Hercolube A (a series of plasticizers suited for use in plastic and surface coatings; Hercules Powder Co.; see "Material Trade Names," by Zimmerman and Lavine, a copy in Army Library), or Dow Corning DC–200, is admitted to the cylinders of the intensifier 1. A specimen 62 to be tested is placed in the high pressure cylinder 10 through bore 7 and the intensifier filled until overflowing before replacing closure plug 21.

This procedure eliminates the need for the vacuum pump each time a new specimen is tested. Excess hydraulic fluid is allowed to drain through port 24 and port valve 56 to overflow beaker 54.

An initial pressure is then applied by pump 45 through valve 50, gage 51 and port valve 48 to the low pressure cylinder 8. The piston assembly is forced upward displacing fluid from the intermediate cylinder 9 and increasing the pressure in the high pressure cylinder 10. The fluid displaced from the intermediate cylinder 9 raises the height of the fluid in the sight glass tube 34. (With the present apparatus, a piston displacement that reduces the volume of the high-pressure cylinder .001 cubic inch raises the fluid column in the sight glass tube 6.96 cm.) The reading from the sight glass 34 and the pressure measured by the strain-type pressure transducer 33 permit computation of the bulk modulus of the test specimen. The thermocouple 61 permits the measurement of the bulk modulus to be made under isothermal or adiabatic conditions. The low pressure gage 51 provides a means to check the equipment to insure proper functioning.

The bulk modulus of a test specimen can be computed in this manner for pressures up to 2500 p.s.i. with the apparatus of the invention. A pressure of 10,000 p.s.i. could be obtained with only minor changes.

The basic principles of the present invention could be incorporated into an apparatus which would measure the isothermal and adiabatic bulk modulus at pressures exceeding 50,000 p.s.i.

After each test, pump 44 is operated to return the piston assembly to its original position.

Variations and modifications may be effected without departing from the scope of the novel concept of the present invention as set forth in the appended claims.

What is claimed is:

1. An apparatus for measuring bulk modulus of viscoelastic materials including in combination, a pressure intensifier comprising a low pressure cylinder; an intermediate pressure cylinder coaxially arranged with said low pressure cylinder and a high pressure cylinder having a lesser diameter than said low and intermediate cylinders and arranged in coaxial relation therewith, said high pressure cylinder adapted to receive a specimen for measuring therein; a piston assembly slidably mounted between said low and intermediate cylinders, said piston assembly including a portion slidable in said high pressure cylinder; a first pump in connection with the upper portion of said high pressure cylinder for filling said cylinders with a hydraulic fluid; a second pumping means connected to said low pressure cylinder for compressing said hydraulic fluid in said cylinders; visual means for reading fluid displacement in said cylinders and connected to said intermediate cylinder; means for measuring fluid pressure connected to said high pressure cylinder and means thereby for measuring the bulk modulus of said specimen and the porosity of said specimen.

2. An apparatus as set forth in claim 1 wherein said visual means for reading fluid displacement in said intensifier comprises a vertical support, a sight glass tube in connection with said intermediate cylinder of said intensifier, a vertical scale disposed in spaced relation from said sight glass tube and a reading slide slidably mounted on said sight glass tube and overlapping said scale.

3. An apparatus as set forth in claim 1 including visual or other means for reading fluid displacement in said intensifier wherein means also are provided for measuring temperature within said high pressure cylinder, thereby providing means for measuring either the adiabatic bulk modulus of said specimen or the isothermal (equilibrium) bulk modulus of said specimen in addition to means for measuring the porosity of said specimen.

References Cited by the Examiner

UNITED STATES PATENTS

| | | | |
|---|---|---|---|
| 2,327,642 | 8/43 | Horner | 73—49.4 X |
| 2,329,035 | 9/43 | Cross | 73—49.4 |
| 2,821,851 | 2/58 | Daley | 73—37 |
| 2,880,611 | 4/59 | Herren | 73—53 |

RICHARD C. QUEISSER, *Primary Examiner.*

JOSEPH P. STRIZAK, *Examiner.*